(12) United States Patent
Lee

(10) Patent No.: US 8,159,721 B2
(45) Date of Patent: Apr. 17, 2012

(54) SCANNING APPARATUS AND METHOD CALCULATES DISTORTION BOUNDARY OF DISTORTION AREA BASED ON SHADOW VALUES TO CORRECT SCANNED IMAGE

(75) Inventor: Seung-yup Lee, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 810 days.

(21) Appl. No.: 12/208,477

(22) Filed: Sep. 11, 2008

(65) Prior Publication Data

US 2009/0141312 A1    Jun. 4, 2009

(30) Foreign Application Priority Data

Dec. 3, 2007   (KR) .................. 10-2007-0124580

(51) Int. Cl.
*H04N 1/409* (2006.01)
(52) U.S. Cl. ...................... 358/3.26; 358/461
(58) Field of Classification Search .......... 358/1.9, 358/3.26, 461, 463; 382/274, 275, 199, 205
See application file for complete search history.

(56) References Cited

U.S. PATENT DOCUMENTS

| | | | |
|---|---|---|---|
| 6,330,050 B1 | 12/2001 | Takahashi et al. | |
| 6,421,146 B1 * | 7/2002 | Yoo | 358/461 |
| 6,498,867 B1 * | 12/2002 | Potucek et al. | 382/274 |
| 6,816,624 B1 | 11/2004 | Ebisawa et al. | |
| 2008/0112639 A1 * | 5/2008 | Min et al. | 382/264 |
| 2010/0103474 A1 * | 4/2010 | Oiwa et al. | 358/461 |

FOREIGN PATENT DOCUMENTS

| | | |
|---|---|---|
| JP | 2003-189082 | 7/2003 |
| JP | 2005-229192 | 8/2005 |
| JP | 2006-186643 | 7/2006 |

OTHER PUBLICATIONS

Korean Office Action for corresponding Korean Patent Application No. 10-2007-0124580 dated Nov. 24, 2011.

* cited by examiner

*Primary Examiner* — Scott A Rogers
(74) *Attorney, Agent, or Firm* — Staas & Halsey LLP

(57) ABSTRACT

A scanning apparatus which scans an image of a document to generate an image data, the scanning apparatus includes: a boundary sensing unit to sense a boundary of the image, and a distortion area, a distortion boundary of which is not sensed; a shadow calculating unit to calculate a shadow value of the image data; and a control unit to calculate the distortion boundary of the distortion area according the shadow values of the distortion area so as to correct distortion of an image caused by variations in focal distances between the image and the lenses within the scanning apparatus.

21 Claims, 12 Drawing Sheets

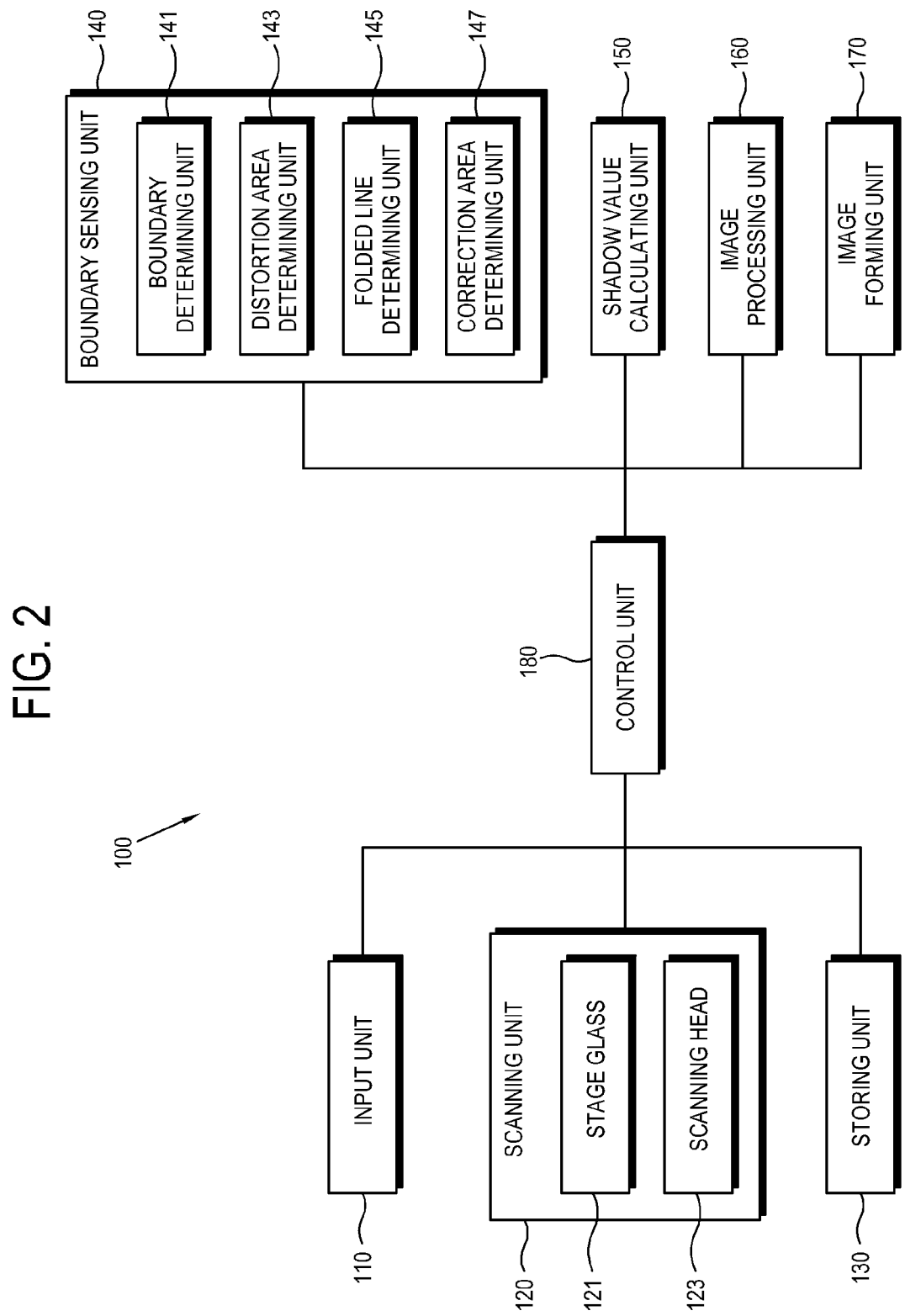

SCANNING APPARATUS AND METHOD CALCULATES DISTORTION BOUNDARY OF DISTORTION AREA BASED ON SHADOW VALUES TO CORRECT SCANNED IMAGE

CROSS-REFERENCE TO RELATED APPLICATIONS

This application claims benefit of Korean Patent Application No. 2007-124580, filed on Dec. 3, 2007, in the Korean Intellectual Property Office, the disclosure of which is incorporated herein by reference.

BACKGROUND OF THE INVENTION

1. Field of the Invention

Aspects of the present invention relate to a scanning apparatus, and more particularly, to a scanning apparatus that corrects an image distortion generated in scanning a book.

2. Description of the Related Art

In general, a scanning apparatus scans an image of a document to form an image data having a predetermined resolution. As shown in FIGS. 1A and 1B, a conventional scanning apparatus 10 includes a stage glass 20 on which a document is loaded, and a scanning head 30 under the stage glass 20 that scans an image of the document. The scanning head 30 includes a light source module 31 that emits a light to scan the document, and a photoelectric converting element 33 that senses the light reflected from the document and converts such light into an electric image signal.

In the conventional scanning apparatus 10, if the scanning head 30 moves to scan a book, as shown in FIG. 1B, an area of the book around a binding A fails to directly contact the stage glass 20 and is distanced from the stage glass 20 by a predetermined distance d1. However, a page area B directly contacts the stage glass 20. Accordingly, differences of focal distances (or lengths) between the light source module 31 and the surface of the book (i.e., differences between the distances between the light source module 31 and the area near the binding A and the page area B) result in distortions respectively generated with respect to the different areas of the surface of the book by the photoelectric converting element 33 (i.e., I1≠I2). As shown in FIG. 1C, due to the differences of the focal distances as the scanning head 30 moves, a spatial distortion area is generated in a scanned image near the binding A, resulting in spatial distortion as well as a darker image.

SUMMARY OF THE INVENTION

Accordingly, it is an aspect of the present invention to provide a scanning apparatus and an image correcting method thereof to correct a distortion area included in an image. Additional aspects of the present invention will be set forth in part in the description which follows and, in part, will be obvious from the description, or may be learned by practice of the present invention.

The foregoing and/or other aspects of the present invention provide a scanning apparatus which scans an image to generate an image data, the scanning apparatus comprising: a boundary sensing unit to sense a boundary of the image, and a distortion area, a distortion boundary of which is not sensed; a shadow calculating unit to calculate shadow values of the image data; and a control unit to calculate the boundary of the distortion area based on the shadow values of the distortion area.

According to an aspect of the present invention, the shadow calculating unit may detect each marginal area of a plurality of image lines which are adjacently formed in a scanning direction depending on an image scanning of the document, and calculates an average value of the shadow value of the marginal areas.

According to an aspect of the present invention, the control unit may respectively calculate a coordinate value of a distortion area starting point at which the distortion area is started, a fold end point which divides the distortion area into two along the boundary of the image which is sensed by the boundary sensing unit, and an average value of a shadow value of a marginal area of an image line which includes the coordinate value of the distortion area starting point.

According to an aspect of the present invention, the control unit may calculate a correlation between a coordinate value of a point in the distortion area and the shadow value of the point in the distortion area based on the calculated coordinate value of the distortion area starting point, the fold end point, and the calculated average value of the shadow value.

According to an aspect of the present invention, the control unit may calculate the distortion boundary of the distortion area, the distortion boundary being between the distortion area starting point and the fold end point according to the correlation.

According to an aspect of the present invention, the control unit may determine a reference line, the reference line being an ideal boundary line which minimizes distortion of the distortion area, and may calculate a correction coefficient which maps coordinate values of the distortion boundary to the reference line.

According to an aspect of the present invention, the scanning apparatus may further comprise an image processing unit which processes the image data, wherein the control unit controls the image processing unit to process the distortion boundary and an image data inside the distortion area according to the correction coefficient to generate a corrected image data.

According to an aspect of the present invention, the scanning apparatus may further comprise an image forming unit which outputs the image data, wherein the control unit controls the image forming unit to output the corrected image data.

According to an aspect of the present invention, the foregoing and/or other aspects of the present invention provide an image correcting method of a scanning apparatus, comprising: scanning a document to generate an image data; detecting a boundary of the image data; calculating shadow values of the image data; calculating coordinate values of the boundary, and sensing a distortion area having a distortion boundary of which coordinate values of the distortion boundary are not calculated; and calculating a distortion boundary of the distortion area according to the shadow values of the distortion area.

According to an aspect of the present invention, the calculating of the shadow values of the image data may further comprise detecting each marginal area of a plurality of image lines which are adjacently formed in a scanning direction depending on an image scanning of the document, and calculating an average value of the shadow value of the marginal areas.

According to an aspect of the present invention, the image correcting method of the scanning apparatus may further comprise respectively calculating a coordinate value of a distortion area starting point at which the distortion area is started, a fold end point which divides the distortion area into two along the boundary of the image which is sensed in the detecting the boundary of the image data, and an average value of the shadow values of a marginal area of an image line which comprises the coordinate value of the distortion area starting point.

According to an aspect of the present invention, the image correcting method of the scanning apparatus may further comprise calculating a correlation between a coordinate value of a point in the distortion area and the shadow value of the point in the distortion area based on the calculated coordinate value of the distortion area starting point, the fold end point, and the calculated average value of the shadow values.

According to an aspect of the present invention, the image correcting method of the scanning apparatus may further comprise calculating coordinate values of the distortion boundary, the distortion boundary being between the distortion area starting point and the fold end point, according to the correlation.

According to an aspect of the present invention, the image correcting method of the scanning apparatus may further comprise: determining a reference line, the reference line being an ideal boundary line which minimizes distortion of the distortion area, and calculating a correction coefficient which maps coordinate values of the distortion boundary to the reference line.

According to an aspect of the present invention, the image correcting method of the scanning apparatus may further comprise processing the distortion boundary and an image data inside the distortion area according to the correction coefficient to generate a corrected image data.

According to an aspect of the present invention, the image correcting method of the scanning apparatus may further comprise outputting the generated corrected image data.

The foregoing and/or other aspects of the present invention provide an image correcting method of a scanning apparatus, comprising: scanning a document to generate an image data; and calculating a distortion boundary of a distortion area of the image data according to shadow values of an image line in a reference direction which corresponds to the distortion area.

According to an aspect of the present invention, the distortion area may be an area which comprises a distortion area starting point at which a distortion boundary of the image data is not sensed and a fold end point of the image data.

According to an aspect of the present invention, the calculating of the distortion boundary of the distortion area may further comprise correlating between a coordinate value of the reference direction with respect to the distortion boundary and a shadow value in the distortion area, respectively, according to the coordinate value of the distortion area starting point, the fold end point, and the shadow value.

According to an aspect of the present invention, the image correcting method of the scanning apparatus may further comprise calculating a coordinate value of each distortion boundary depending on the reference direction between the distortion area starting point and the fold end point according to the correlation.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 is a block diagram schematically illustrating a configuration of a scanning apparatus according to an exemplary embodiment of the present invention;

DETAILED DESCRIPTION OF THE EMBODIMENTS

Figure 1A:
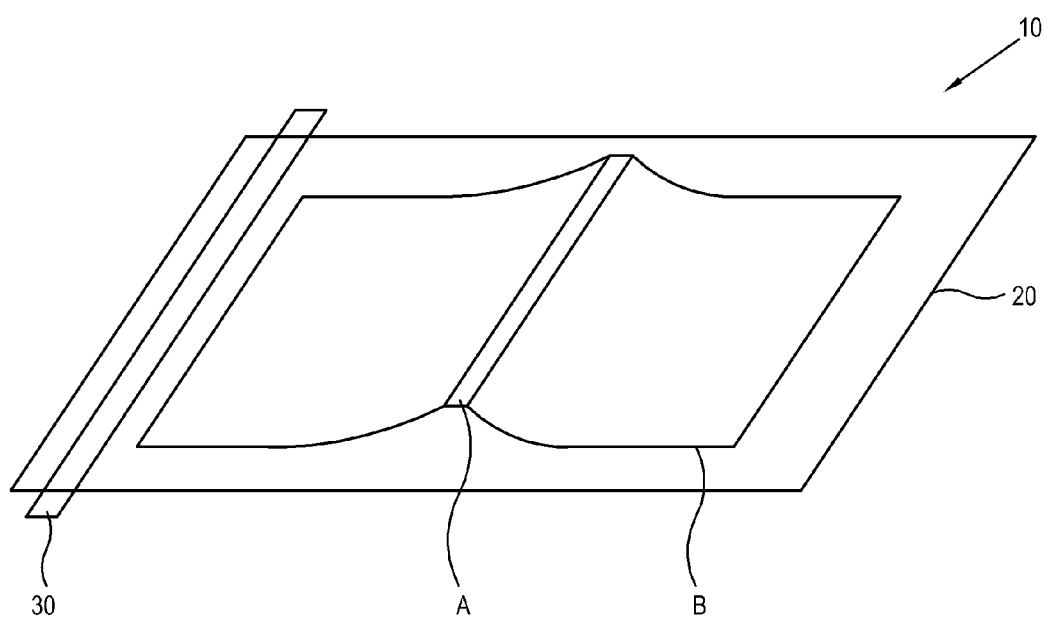
FIGS. 1A to 1C illustrate image distortion of a conventional scanning apparatus.

Reference will now be made in detail to the embodiments of the present invention, examples of which are illustrated in the accompanying drawings, wherein like reference numerals refer to like elements throughout. The exemplary embodiments are described below so as to explain aspects of the present invention by referring to the figures.

FIG. 2 is a block diagram schematically illustrating a configuration of a scanning apparatus 100 according to an exemplary embodiment of the present invention. As shown therein, the scanning apparatus 100 includes an input unit 110 to receive a signal from a user, a scanning unit 120 to scan an image of a document, and a storing unit 130 to store an image data generated by the scanning unit 120.

Also, the scanning apparatus 100 includes a boundary sensing unit 140 to sense an image boundary in a generated original image data (hereinafter, referred to as 'OID'), a shadow value calculating unit 150 to calculate a shadow value of the OID, an image processing unit 160 to process the OID to be output by an image forming unit 170, the image forming unit 170 to output the OID on a printing medium, and a control unit 180 to correct a distortion area according to the shadow value if it is determined that there is a distorted area in the OID.

The input unit 110 receives a scan signal indicating a scanning function from the user. Also, the input unit 110 may receive a signal indicating whether to correct the distortion area and a signal indicating a user-selected correction area. The input unit 100 may be provided as a plurality of input panels receiving an input signal. Also, a display unit (not shown) that displays the OID generated by a scanning head 123 may be provided.

The scanning unit 120 includes a stage glass 121 on which the document is loaded, and the scanning head 123 under the stage glass 121. The stage glass 121 is loaded with the document thereon and is formed of a transparent glass material so that a light of a light source module 31, shown in FIG. 1, can transmit therethrough. The stage glass 121 may have a known configuration and shape.

The scanning head 123 includes a light source module (not shown) and emits a light to scan the document loaded on the stage glass 121, and a photoelectric converting element unit (not shown) to receive light reflected from a part of the document to convert into a part of an image signal, and an analog to digital converting unit (not shown) to convert the image signal to digital image data. The scanning head 123 moves along a scanning direction under the stage glass 121 and is driven by a driving unit (not shown) according to a control signal from the control unit 180 so that the light source module and the photoelectric converting element unit can scan the document. The driving unit may have the same driving configuration as the conventional scanning head. The driving unit may be a step motor and may move the scanning head via a belt and pulley configuration, a rack and pinion configuration, etc.

Figure 3:
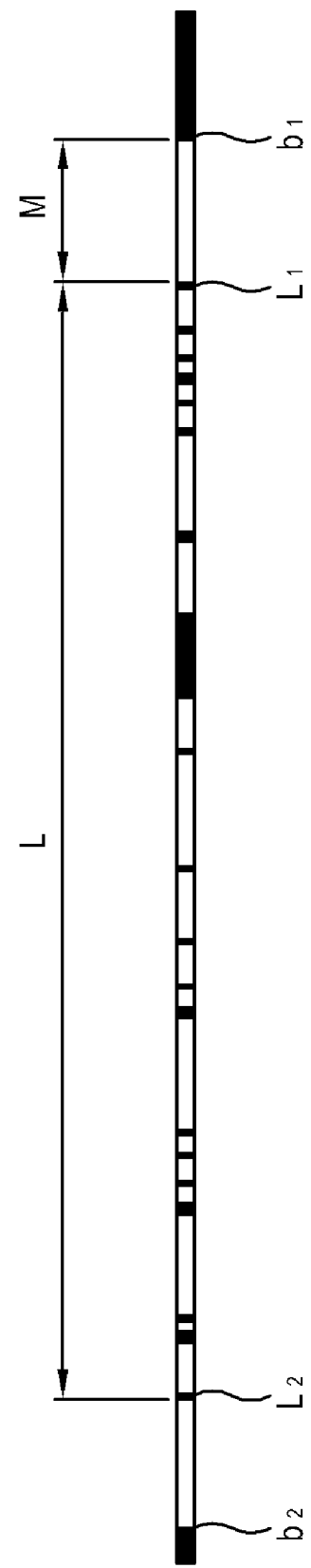
FIG. 3 illustrates an example of a portion of an image data generated by a scanning unit of the scanning apparatus according to an exemplary embodiment of the present invention.

Here, the light source module and the photoelectric converting element unit may generate the OID of the document in the scanning direction as shown in FIG. 3. When the document to be scanned is loaded and the scan signal is received from a user through the input unit 110, the scanning head 123 moves beneath the stage glass 121 in the scanning direction to generate the OID. Alternatively, the scanning head 123 may be stationary, and the document may move, i.e., the scanning apparatus 100 may be of an auto document feeding (ADF) type.

Figure 4:
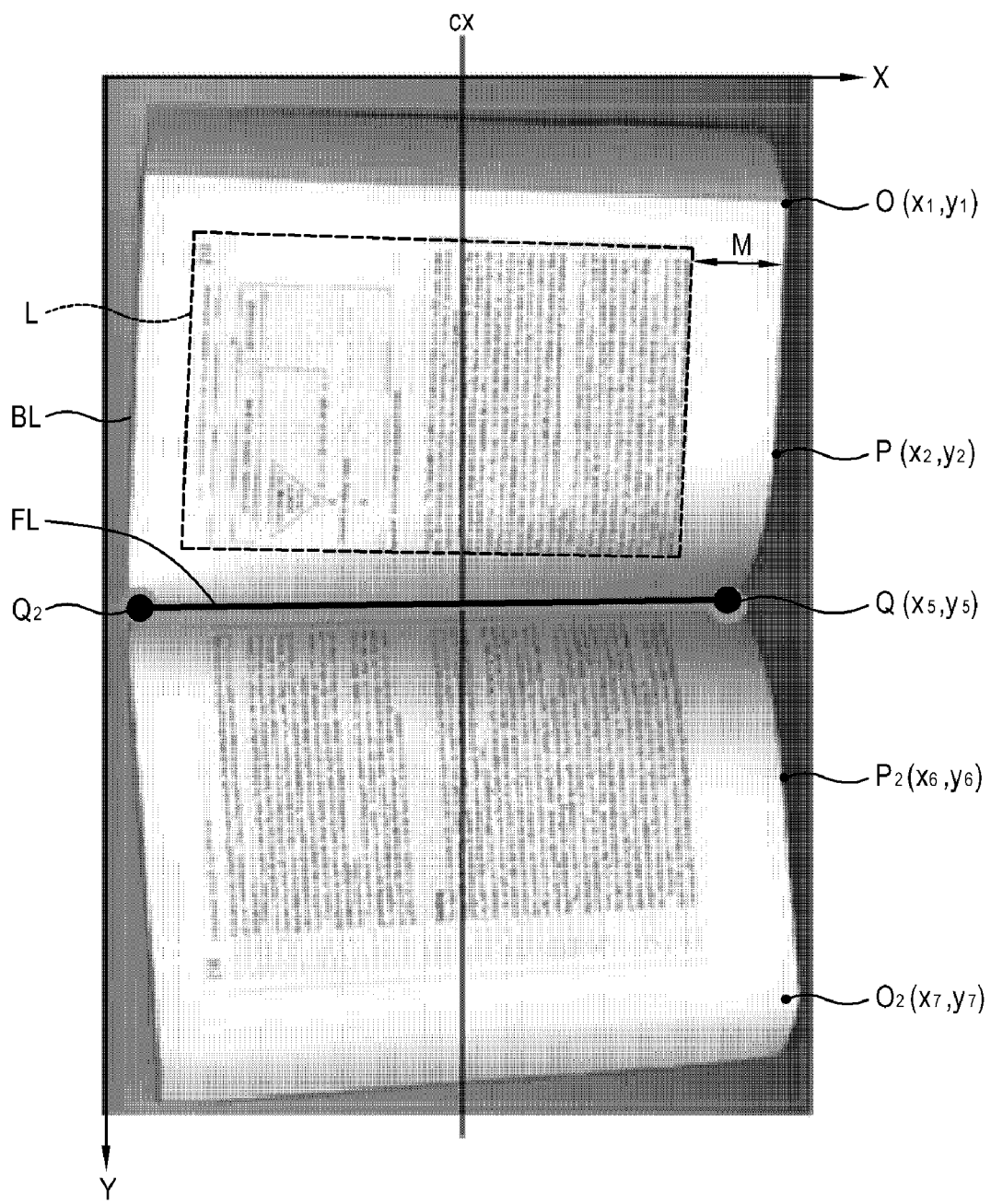
FIG. 4 illustrates an example of an image data including a distortion area.

Also, if the scanning head 123 is moved beneath the stage glass 121 according to the driving unit, the scanning direction of the scanning head 123 is parallel to the axis Y in FIG. 4, and the generated OID of each image line is disposed parallel to the axis X along the axis Y. Here, the image line refers to an image scanned in a line unit by the scanning head 123.

The storing unit 130 stores the OID as generated by the scanning head 123, the shadow value of the OID as generated by the shadow value calculating unit 150, and a corrected image data (hereinafter "CID") as corrected by the image processing unit 160. Here, the storing unit 130 stores the OID corresponding to the image lines, i.e., the OID output from the photoelectric converting element unit of a first image line along the scan direction is stored and organized according to a coordinate value positioned in the document. Further, as each image line along the scanning direction, or a direction parallel to the Y axis, has a constant Y value, the image lines may be stored according to each image line's corresponding Y value.

The boundary sensing unit 140 determines a boundary of the OID stored in the storing unit 130 and senses whether there is a distortion area in the OID. The boundary sensing unit 140 includes a boundary determining unit 141 to determine the boundary of the image included in the OID, a distortion area determining unit 143 to determine the distortion area, a boundary of which is not sensed, and a folded line determining unit 145 to determine a folded line of a document, for example, a binding of a book in the case of scanning or copying the book.

As shown in FIG. 4, if the document is a book having a large thickness, the boundary determining unit 141 senses a boundary BL that divides a document area and a stage glass area in the OID generated by the scanning head 123. As shown in FIG. 3, the boundary determining unit 141 compares a data value of each pixel (i.e., a first pixel) of the OID obtained in each image line along the scanning direction (i.e., the Y axis of FIG. 4) with a data value of a vicinal or adjacent pixel (i.e., a second pixel) to determine whether the corresponding pixel (the first pixel) is a boundary within the corresponding image line. That is, if the difference between the data value of the vicinal pixel (second pixel) and the data value of the corresponding pixel (the first pixel) is bigger than a reference value, the corresponding pixel (the first) is determined to be a pixel corresponding to the boundary (a boundary pixel). Accordingly, in case of FIG. 3, when it is determined from an outer side, pixels b1 and b2 at which the data value is clearly divided into black and white may be determined to be pixels corresponding to the boundary BL of the corresponding line (i.e., determined to be boundary pixels). Specifically, the boundary determining unit 141 determines the edges of the item being scanned, e.g., the edges of a book. The boundary determining unit 141 determines a boundary with respect to each image line along the axis Y with the same method. Here, the determined boundaries are stored in the storing unit 130 as a coordinate value. Further, the boundary determining unit 141 may determine if the entire image line corresponds to a portion outside of the document in the X axis direction, i.e., with reference to FIG. 4, a image line having an x value greater than x1 of point O (x1,y1).

Figure 1B:
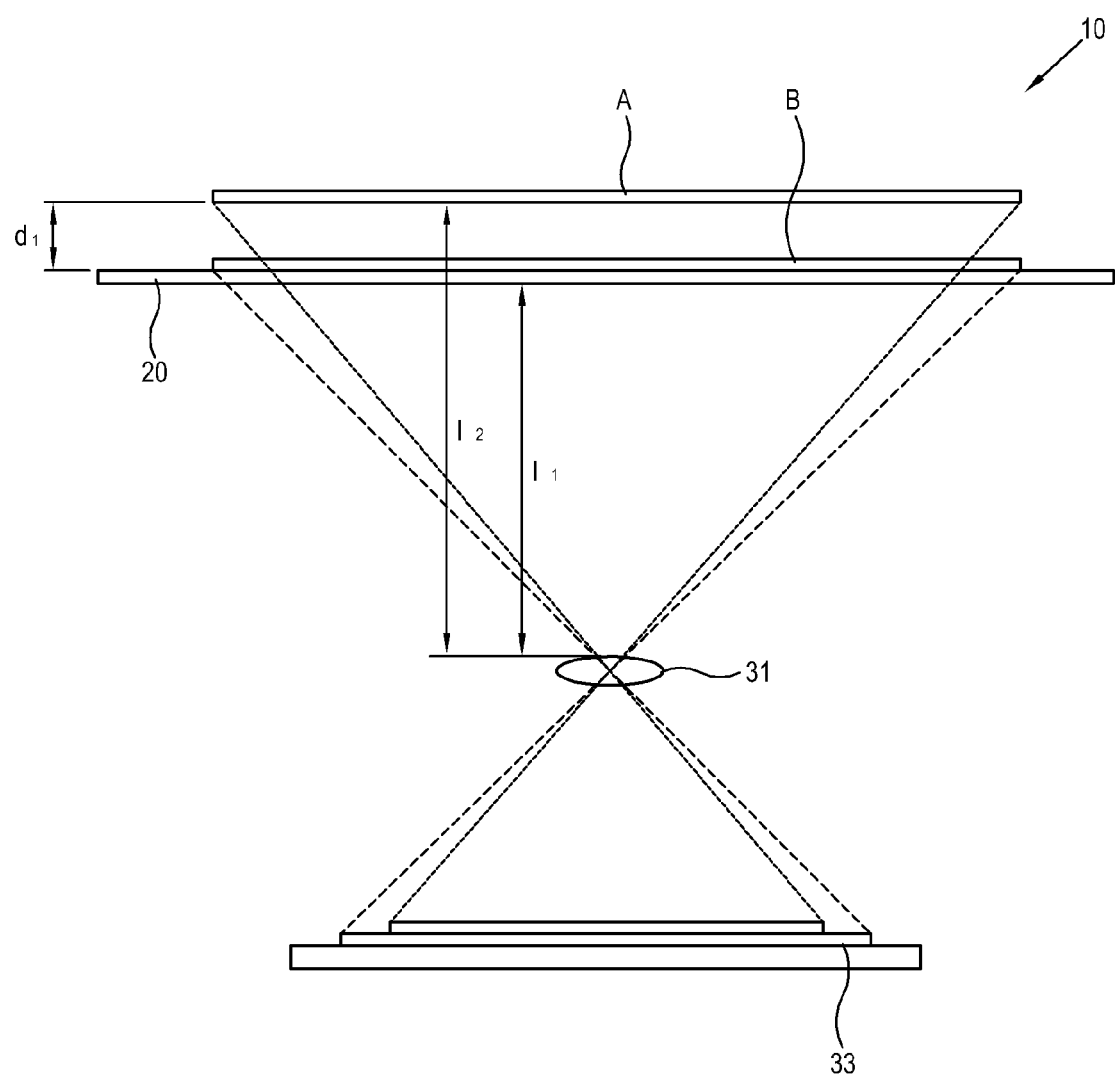
Figure 1C:
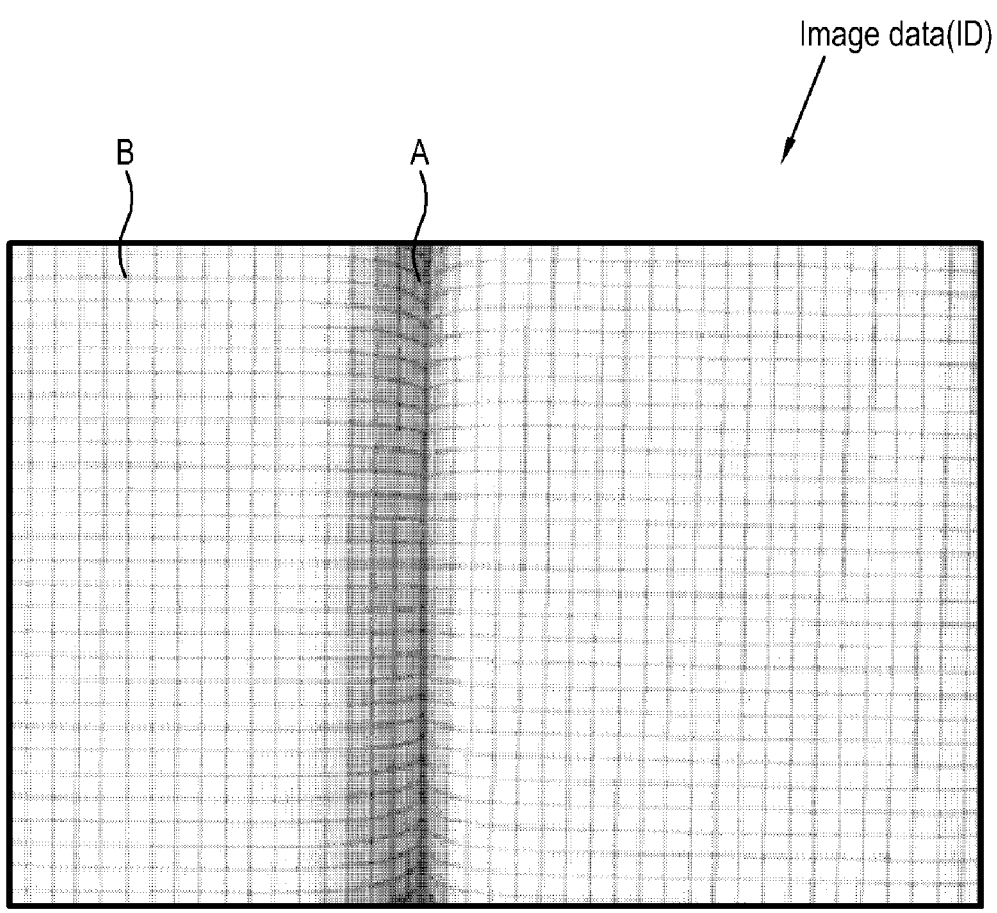

The distortion area determining unit 143 senses a distortion area, the boundary of which is vague, when the boundary determining unit 141 senses the boundaries of each image line along the scanning direction of the scanning head 123, i.e., along the axis Y. As shown in FIG. 4, the distortion area appears darker nearer a folded line FL (i.e., the area near the binding A as described above) than vicinal areas nearer a text area L (the page area B) and includes an area in which the boundary of the distortion area appears unclear as the document to be scanned (i.e., a book) is increasingly separated from the stage glass (20 in FIGS. 1A and 1B). In general, if a book is scanned, the distortion area is generated about the folded line FL, which is a central area of the book and a point of greatest separation of the document to be scanned from the stage glass (i.e., the document to be scanned is the distance d1 away from the stage glass as shown in FIG. 1B). Although aspects of the invention are described with reference to a book, aspects of the present invention need not be limited thereto such that aspects may be applied to scanning of a folded document or other object to be scanned that has areas of differing distances from the stage glass (i.e., the object to be scanned is irregular such that the focal distances or lengths between the light module and the object differ and produce distortions in the scanned image).

The folded line determining unit 145 senses the folded line FL of the OID. As shown in FIG. 4, if the document is a book, the folded line FL indicates a folded area of a central area of the book (i.e., near the binding of the book). The folded line FL appears as a line connecting two points, an upper fold end point Q and a lower fold end point Q2. Here, each fold end point Q and Q2 may be determined at a position exceeding 90% of the length of the book by sensing the boundary of the most outer side in an X axis direction with respect to the boundary determined in the boundary determining unit 141, or may be determined as points, the slope of which is opposite by sensing the slope of vicinal boundaries of the OID.

As shown therein, if the distortion area is determined to exist by the distortion area determining unit 143, a correction area determining unit 147 may determine four correction areas of the OID as defined by the folded line FL and an axis CX. That is, the correction area may be determined as an upper-right area, a lower-right area, an upper-left area and a lower-left area about the folded line FL, i.e., the distortion area may be split into quadrants, each representing one correction area.

Here, the boundary of the correction area determined by the correction area determining unit 147, for example, the upper-right area in FIG. 4, may be generally defined by the following points: a distortion area starting point P (x2, y2) at which the distortion area is started; the fold end point Q (x5, y5), and an intersection of the axes X and CX among the boundaries determined in the boundary determining unit 141.

If the boundary is not sensed in the vicinal image lines when the boundary determining unit 141 determines the boundary by each image line along the axis Y, the distortion area starting point P may be selected as a boundary of the corresponding image line. Similar determinations are made with respect to the lower-right correction area, for example, as shown in FIG. 4 using such points as a distortion area starting point P2 (x6, y6), a boundary point O2, and the fold end point Q (x5, y5).

Figure 8A:
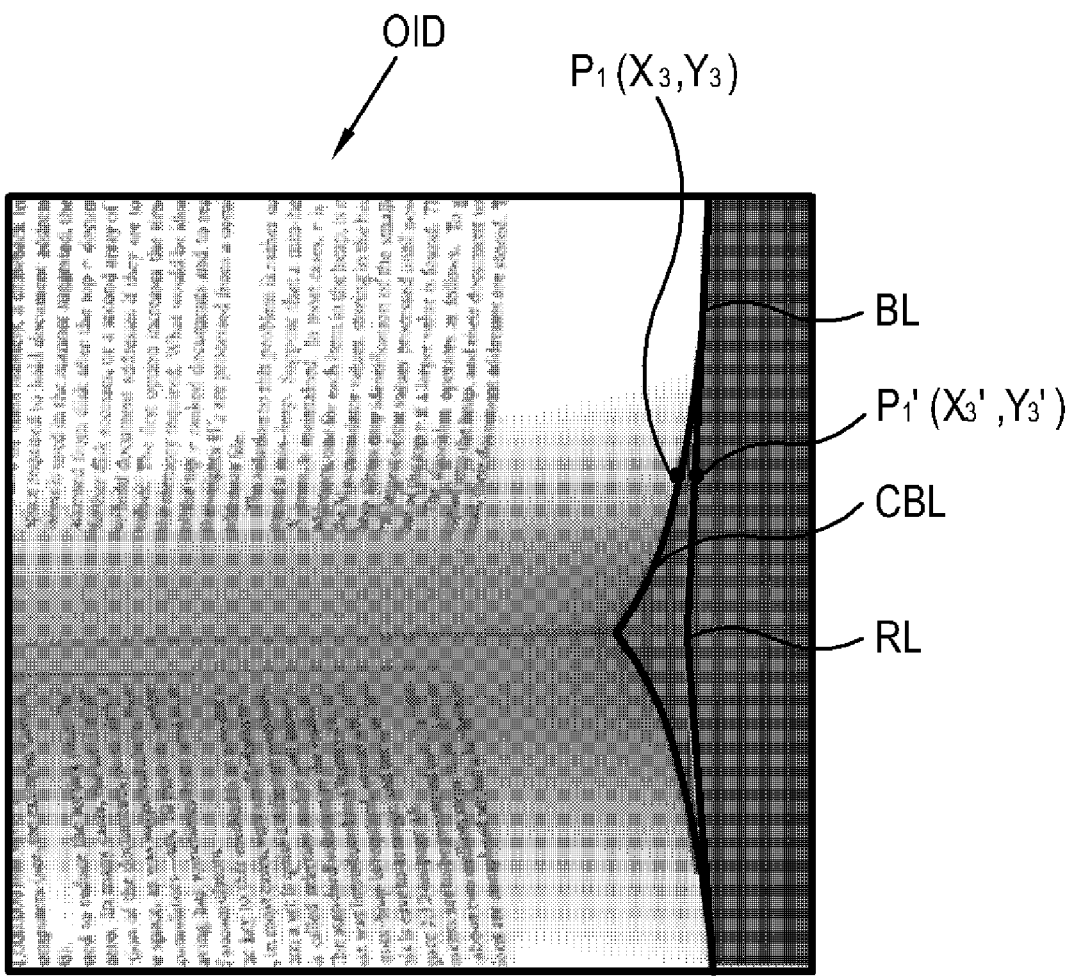
FIGS. 8A and 8B illustrate the image data before and after an image correction according to an exemplary embodiment of the present invention.

The boundary determining unit 141 calculates boundary lines linking the determined boundary pixels of each image line, i.e., determines the boundary line as a line of adjacent boundary pixels of adjacent lines in the direction of the axis Y, and selects a boundary line as a reference line RL. As shown in FIG. 8A, the reference line RL indicates a line which is to appear as the boundary line of the OID if distortion is not generated in the OID, i.e., the reference line RL is the boundary line of the OID if the document being scanned were flat against the stage plate. In the present exemplary embodiment, the straight line which passes through a boundary point O (x1, y1) and the distortion area starting point P2 (x6, y6) and extends to the folded line FL may be selected as the reference line RL.

The shadow value calculating unit 150 calculates a shadow value of the total areas of the OID generated by the scanning head 123. The shadow value calculating unit 150 calculates a marginal area in the OID of each image line, and calculates an average value of the shadow value of the marginal area M. That is, as shown in FIG. 4, if the document is a book, the OID may be divided into a text area L in which a text is displayed, and a marginal area M, in which text is not displayed. The shadow value calculating unit 150 extracts the marginal area M from each image line to calculate a shadow value of the corresponding marginal area M. In general, the marginal area M continuously appears so that the shadow value of each pixel is close to white. Accordingly, in the case of FIG. 3, a section in which a white value continuously appears from the boundary $b_1$, and a shadow value L1 corresponding to a location in which the first text appears in the scanning direction, is determined to be the marginal area M. Similarly in FIG. 3, a section in which a white value continuously appears from the boundary b2, and a shadow value L2 corresponding to a location in which the first text appears in a scan direction, is also determined to be the marginal area M.

The shadow value calculating unit 150 calculates the marginal area M in each image line along the scanning direction and calculates the average value of the shadow value of the marginal area of each calculated image line. Here, the shadow value calculating unit 150 calculates the shadow value of the correction areas corresponding to the distortion area together.

Figure 5:
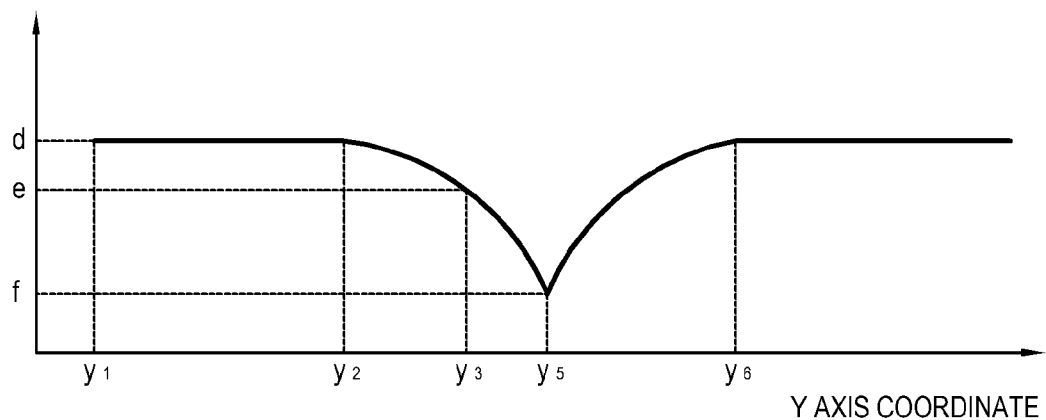
FIG. 5 is a graph illustrating a shadow average value of a marginal area of the image data in FIG. 4.

In this case, if the document is a book as shown in FIG. 4, the average value of the shadow value is calculated with respect to each image line along the axis Y, which is the scanning direction, like a graph shown in FIG. 5. Here, the shadow value has a value of 0~255. A shadow value of 255 represents white, and a shadow value of 0 represents black. As shown in FIG. 5, the average value of the shadow value of the OID appears white from the beginning of the image line to the distortion area starting point P (y2) along the axis Y in the scanning direction, and appears to grow darker from the distortion area starting point P (y2) to the fold end point Q (y5). Also, the average value of the shadow value appears to grow whiter after passing by the fold end point Q (y5). This graph pattern of the shadow value corresponds to a pattern of the boundary line of the OID at a distance from the axis X in FIG. 4, i.e., if the current image line exhibits such a pattern, the image line indicates distortion in the OID.

If the distortion boundary in the distortion area is determined based on the shadow value, the control unit 180 of the image processing unit 160 generates the corrected image data (CID). With reference to FIG. 8A, if the distortion boundary CBL in the distortion area is determined, and a correction coefficient is calculated according to the shadow value, the image processing unit 160 generates the CID based on the correction coefficient.

The image forming unit 170 outputs the CID generated in the image processing unit 160 on the printing medium according to a control signal of the control unit 180. The image forming unit 170 may output the CID on the printing medium according to an inkjet type, an electrophotographic type, or a thermal transferring type printing medium; however, aspects of the present invention are not limited thereto such that the CID may be output as an electronic document. In the inkjet type, an ink cartridge reciprocates in a transverse direction to a paper to apply an ink drop on the paper, thereby outputting the CID on the paper. The electrophotographic type selectively applies a developer on a paper according to an electric potential difference among the developer, a photosensitive body, and a transferring roller, thereby outputting the CID on the paper. The heat transferring type heats and presses an ink ribbon coated with an ink against a paper to transfer the ink to the paper, thereby outputting the CID on the paper.

As shown in FIG. 8, the control unit 180 calculates the distortion boundary CBL in the distortion area based on the boundaries sensed by the boundary sensing unit 140 and the average valued of the shadow valued calculated in the shadow value calculating unit 150. With respect to the correction area as shown in FIG. 4, the control unit 180 respectively obtains the coordinate values of the distortion area starting point P (x2, y2) at which the distortion area is started and the fold end point Q, and the average value of the shadow value of the marginal area of the image line including the corresponding coordinate value from the boundary sensing unit 140 and the shadow value calculating unit 150. Also, the control unit 180 calculates a correlation between the distortion boundary CBL in the distortion area and the shadow value based on the average values of the shadow values about each coordinate value.

Referring to FIGS. 4 and 5, the correlation of the shadow value with respect to the coordinate value is calculated based on coordinate values x2 and y2 of the distortion area starting point P and an average value d of a shadow value of a line including these coordinate values, and coordinate values x5 and y5 of the fold end point Q and an average value f of a shadow value of a line including these coordinate values.

Since the coordinate value of the axis Y varies in sequence as moving by a line from y2, the correlation between the coordinate value of the axis X inside the distortion area boundary and the average value of the shadow value may be calculated.

Figure 6:
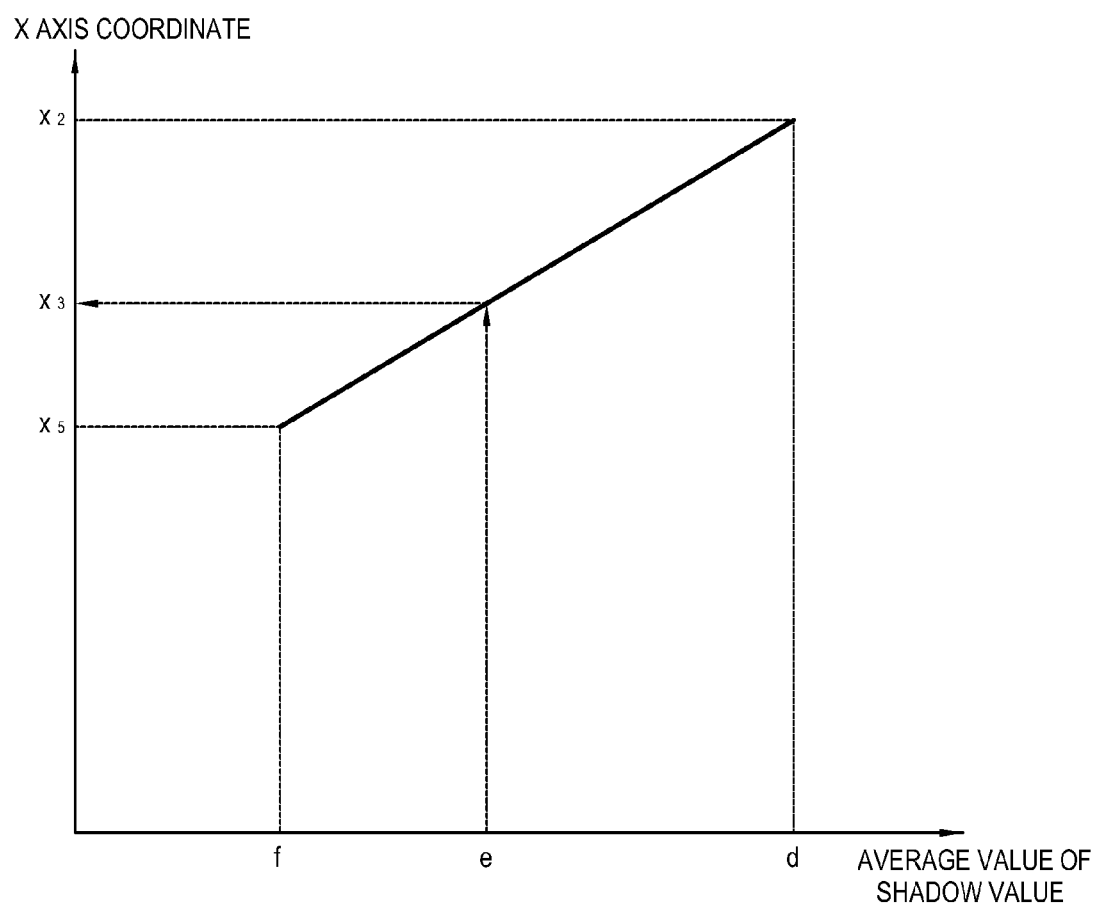
FIG. 6 is a graph illustrating relation between an x-coordinate value and the shadow average value of the distortion area in FIG. 4.

If the transverse axis of the graph is determined as the average value of the shadow value of the line including the coordinate value of two points, and the vertical axis is determined as the X axis coordinate value, a graph may be calculated as shown in FIG. 6. Through this graph, the correlation calculating the X axis coordinate of the distortion area boundary according to the shadow value of each line inside the distortion area can be obtained.

For example, in case of FIG. 6, the correlation may be represented by the following Formula 1:

$$X \text{ axis coordinate value} = (d-f)/(x2-x5) \times e + x5 \quad \text{Formula 1}$$

If the correlation is obtained, the control unit 180 calculates X axis coordinates of the distortion boundary CBL from the distortion area starting point P to calculate the distortion boundary CBL of each image line. The control unit 180 calculates a correction coefficient which is capable of mapping the calculated distortion boundary CBL with the above-referenced line RL within each image line of the distortion area.

Figure 7:
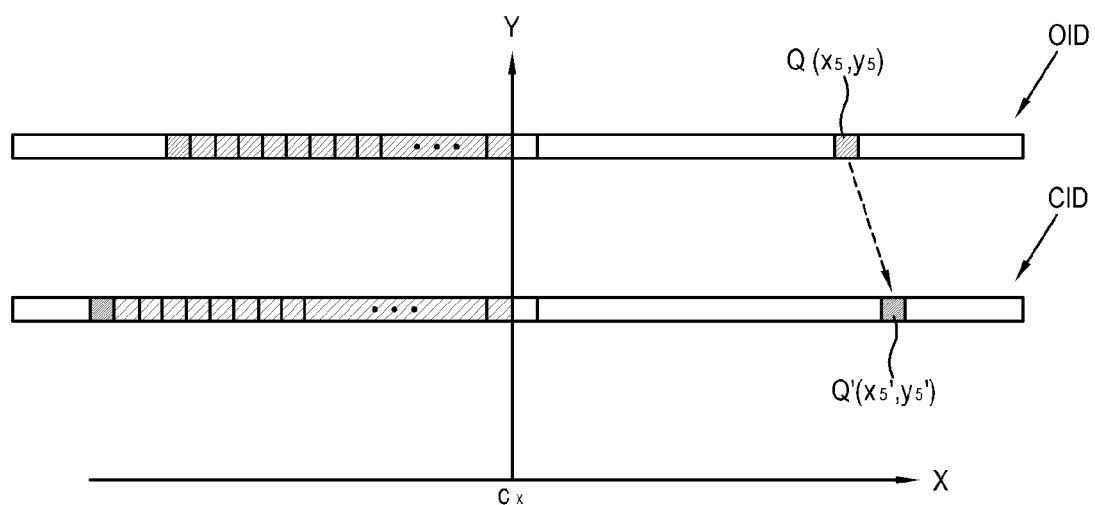
FIG. 7 illustrates a process to map a distortion boundary of the distortion area with a reference line.

Referring to FIGS. 4 and 7, the correction coefficient may be obtained according to a ratio of the distance from the axis CX to each distortion boundary CBL, and the distance from the center of the axis CX to the reference line RL.

Also, the correction coefficient is calculated, and a coordinate value of an arbitrary point inside the distortion boundary CBL, which is to be mapped when the distortion boundary CBL is mapped to the reference line RL, can be calculated according to the correction coefficient.

Here, since each correction coefficient has a different value according to each image line of each distortion boundary CBL, formula obtaining each coordinate value may vary according to each image line.

The above formula may be differently obtained depending on the reference line RL, the distortion boundary CBL, and the relation with respect to the axis CX for other correction areas with respect to the axis CX.

Hereinafter, an image correcting method of the scanning apparatus 100 according to the present exemplary embodiment will be described by referring to FIGS. 3 to 9.

At first, if a user inputs a scanning signal through the input unit 110, the scanning head 123 moves in the scanning direction (i.e., moves in the direction of the Y axis), and scans a document loaded on the stage glass 121 to generate an image data (OID) of each image line as shown in FIG. 3 (S110), wherein each image line corresponds to an X value or has a constant X value.

If the OID of the document is completely generated, the boundary sensing unit 140 detects an image and a boundary of the stage glass 121 from the OID of each image line (S120). Here, the boundary sensing unit 140 determines whether there is a distortion area, a boundary of which is not detected, and informs the control unit 180 if there is the distortion area (S130).

If the distortion area exists in the OID, the control unit 180 applies a signal to the shadow value calculating unit 150 to calculate a shadow value of the total area of the OID (S140). Here, the shadow value calculating unit 150 calculates a marginal area of each image line along the scanning direction, and calculates an average value of the shadow value in the calculated marginal area as shown in FIG. 5.

The control unit 180 divides the OID into a plurality of correction areas depending on a predetermined reference, and selects a distortion area starting point P for each correction area, and a fold end point Q of a folded line FL. Also, the control unit 180 calculates a correlation between an X coordinate value of a distortion area boundary in the distortion area and the average value of the shadow value based on coordinate values of the distortion area starting point P, the fold end point Q, and the average value of the shadow value obtained from the boundary sensing unit 140 and the shadow value calculating unit 150.

The control unit 180 calculates coordinate values of the distortion area boundary of each line inside the distortion area based on the calculated correlation, and calculates a correction coefficient to map these distortion area boundaries with the reference line RL, which is a linking line of a plurality of boundaries.

The control unit 180 applies a signal to the image processing unit 160 to generate a correction image data (CID) correcting the distortion area boundary and an image inside the distortion area boundary based on the correction coefficient.

For example, in case of a line including a distortion boundary P1, as shown in FIG. 8A, the image processing unit 160 converts coordinate values x3 and y3 of the distortion boundary P1 of the OID into coordinate values P1' (x3', y3') mapped on the reference line RL depending on the correction coefficient to generate the CID (S190).

Figure 8B:
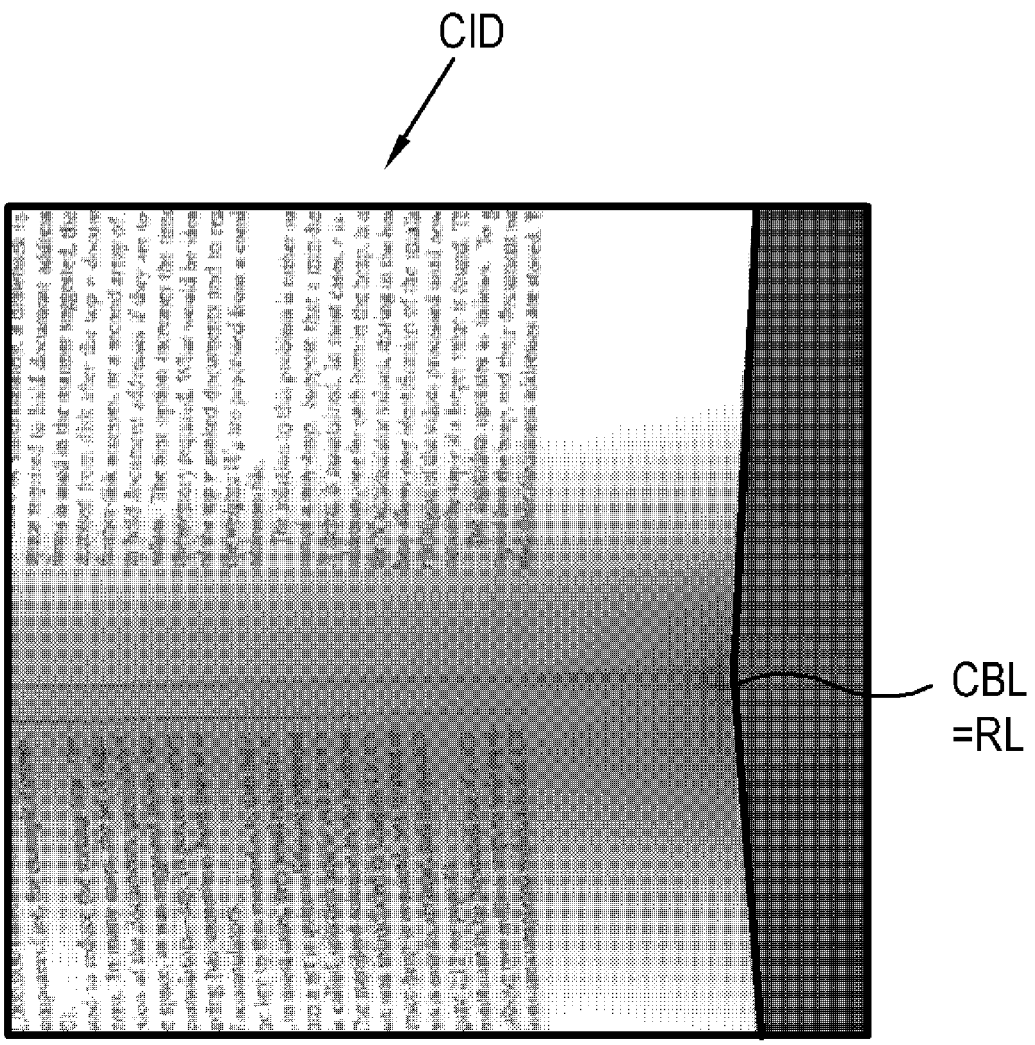
Figure 9:
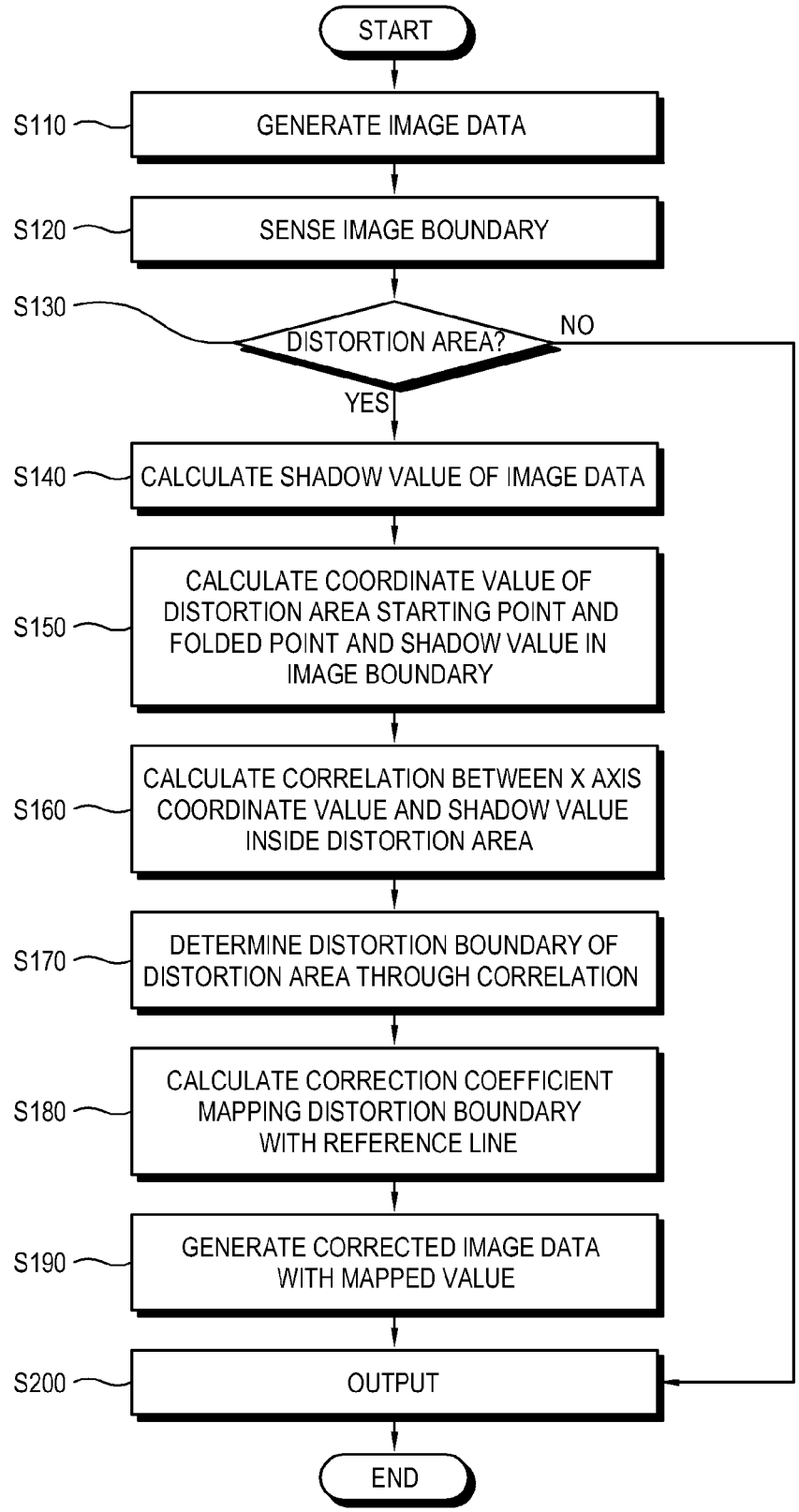
FIG. 9 is a flowchart illustrating an image correcting method of the scanning apparatus according to an exemplary embodiment of the present invention.

FIGS. 8A and 8B illustrate examples of the OID and the CID on a printing medium. FIG. 8A shows the distortion area boundary of the distortion area of the OID, i.e., image data that has not been corrected, and FIG. 8B shows the CID, i.e., image data that has been corrected, according to the present exemplary embodiment. As shown therein, the distortion boundary CBL is corrected to approximately align with the reference line RL, and images therein are corrected so as to increase the quality of the image according to aspects of the present invention.

FIG. 7 provides further illustration of the OID and the CID with reference to a correction of a data line of the OID in an X direction. Therein, the fold end point Q (x5, y5) of the OID is moved in the X direction to a corrected fold end point Q' (x5', y5') in the CID according to the determined correction coefficient.

According to aspects of the present invention, the control unit exemplarily calculates the distortion area boundary according to the average value of the shadow value of the marginal area of the OID. Alternatively, the distortion area boundary may be calculated by using the summation of the shadow value, the standard deviation of the shadow value, or the like.

As describe above, aspects of the present invention correctly calculate a distortion boundary CBL of a distortion area according to a shadow value of an OID. Also, the calculated distortion boundary CBL is corrected to output an image data that more closely approximates a real document.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A scanning apparatus which scans an image to generate an image data, the scanning apparatus comprising:
    a boundary sensing unit to sense a boundary of the image data and a distortion area, of which a distortion boundary is not sensed, of the image data;
    a shadow calculating unit to calculate shadow values of the image data; and
    a control unit to calculate the distortion boundary of the distortion area according to the shadow values of the distortion area of the image data if the boundary sensing unit senses the distortion area.

2. The scanning apparatus according to claim 1, wherein the shadow calculating unit detects each marginal area of a plurality of image lines which are adjacently formed in a scanning direction depending on an image scanning and calculates an average value of the shadow values of the marginal areas.

3. The scanning apparatus according to claim 2, wherein the control unit respectively calculates coordinate values of a distortion area starting point at which the distortion area is started and a fold end point which divides the distortion area into two along the boundary of the image which is sensed by the boundary sensing unit, and an average value of the shadow values of a marginal area of an image line which includes the coordinate value of the distortion area starting point and the fold end point.

4. The scanning apparatus according to claim 3, wherein the control unit calculates a correlation between a coordinate value of a point in the distortion area and a shadow value of the point in the distortion area based on the calculated coordinate values of the distortion area starting point and the fold end point, and the calculated average value of the shadow values of the marginal area of the image line which includes the coordinate value of the distortion area starting point.

5. The scanning apparatus according to claim 4, wherein the control unit calculates the distortion boundary of the distortion area, the distortion boundary being between the distortion area starting point and the fold end point, according to the correlation.

6. The scanning apparatus according to claim 5, wherein the control unit determines a reference line, the reference line being an ideal boundary line which minimizes distortion of the distortion area, and
calculates a correction coefficient which maps coordinate values of the distortion boundary to the reference line.

7. The scanning apparatus according to claim 6, further comprising an image processing unit which processes the image data,
wherein the control unit controls the image processing unit to process the distortion boundary and an image data inside the distortion area according to the correction coefficient to generate a corrected image data.

8. The scanning apparatus according to claim 7, further comprising an image forming unit which outputs the image data,
wherein the control unit controls the image forming unit to output the corrected image data.

9. An image correcting method of a scanning apparatus, comprising:
scanning a document to generate an image data;
detecting a boundary of the image data;
calculating shadow values of the image data;
calculating coordinate values of the boundary, and sensing a distortion area having a distortion boundary of which the coordinate values of the distortion boundary are not calculated; and
calculating a distortion boundary of the distortion area according to the shadow values of the distortion area.

10. The image correcting method of the scanning apparatus according to claim 9, wherein the calculating of the shadow values of the image data further comprises:
detecting each marginal area of a plurality of image lines which are adjacently formed in a scanning direction depending on an image scanning; and
calculating an average value of the shadow values of the marginal areas.

11. The image correcting method of the scanning apparatus according to claim 10, further comprising respectively calculating coordinate values of a distortion area starting point at which the distortion area is started and a fold end point which divides the distortion area into two along the boundary of the image which is sensed in the detecting the boundary of the image data, and an average value of the shadow values of a marginal area of an image line which comprises the coordinate values of the distortion area starting point and the fold end point.

12. The image correcting method of the scanning apparatus according to claim 11, further comprising calculating a correlation between a coordinate value of a point in the distortion area and a shadow value of the point in the distortion area according to the calculated coordinate values of the distortion area starting point and the fold end point, and the calculated average value of the shadow values of the marginal area of the image line which includes the coordinate value of the distortion area starting point.

13. The image correcting method of the scanning apparatus according to claim 12, further comprising calculating coordinate values of the distortion boundary, the distortion boundary being between the distortion area starting point and the fold end point, according to the correlation.

14. The image correcting method of the scanning apparatus according to claim 13, further comprising:
determining a reference line, the reference line being an ideal boundary line which minimizes distortion of the distortion area, and
calculating a correction coefficient which maps coordinate values of the distortion boundary to the reference line.

15. The image correcting method of the scanning apparatus according to claim 14, further comprising processing the distortion boundary and an image data inside the distortion area according to the correction coefficient to generate a corrected image data.

16. The image correcting method of the scanning apparatus according to claim 15, further comprising outputting the generated corrected image data.

17. An image correcting method of a scanning apparatus, comprising:
scanning a document to generate an image data; and
calculating a distortion boundary of a distortion area of the image data according to shadow values of an image line in a reference direction which corresponds to the distortion area,
wherein the distortion area comprises a distortion area starting point at which a boundary of the image data is not sensed and a fold end point of the image data.

18. An image correcting method of a scanning apparatus, comprising:
scanning a document to generate an image data; and
calculating a distortion boundary of a distortion area of the image data according to shadow values of an image line in a reference direction which corresponds to the distortion area,
wherein the calculating of the distortion boundary of the distortion area further comprises correlating between a coordinate value of the reference direction with respect to the distortion boundary and a shadow value in the distortion area, respectively, according to the coordinate values of the distortion area starting point and the fold end point, and the shadow values of the image line in the reference direction which corresponds to the distortion area.

19. The image correcting method of the scanning apparatus according to claim 18, further comprising calculating a coordinate value of each distortion boundary depending on the reference direction between the distortion area starting point and the fold end point according to the correlation.

20. An image correcting method of a scanning apparatus, comprising:
scanning an image in image lines disposed in a scan direction;
determining a distortion area according to a variation in focal distances during the scanning of the image within each image line;
determining a distortion boundary of the distortion area;
determining a correction coefficient by mapping the distortion boundary to an ideal image boundary that minimizes distortion of the image;
correcting the distortion area according to the determined correction coefficient.

21. The image correcting method of claim 20, wherein the determining of the distortion area comprises determining a shadow value of each image line according to the variation in the focal distances during the scanning.

* * * * *

UNITED STATES PATENT AND TRADEMARK OFFICE
CERTIFICATE OF CORRECTION

PATENT NO. : 8,159,721 B2  Page 1 of 1
APPLICATION NO. : 12/208477
DATED : April 17, 2012
INVENTOR(S) : Seung-yup Lee It is certified that error appears in the above-identified patent and that said Letters Patent is hereby corrected as shown below:

Title Page, Column 2 (Abstract), item [57], Line 7, After "according" insert -- to --.

Signed and Sealed this
Third Day of July, 2012

David J. Kappos
*Director of the United States Patent and Trademark Office*